United States Patent [19]

Bloomberg

[11] Patent Number: 5,129,014
[45] Date of Patent: Jul. 7, 1992

[54] IMAGE REGISTRATION

[75] Inventor: Dan S. Bloomberg, Palo Alto, Calif.

[73] Assignee: Xerox Corporation, Rochester, N.Y.

[21] Appl. No.: 349,203

[22] Filed: Dec. 8, 1989

[51] Int. Cl.$^5$ .............................................. G06K 9/20
[52] U.S. Cl. ..................................... 382/48; 358/101; 382/8; 382/41; 382/49
[58] Field of Search ............... 382/41, 49, 48, 9, 8, 382/27; 358/101, 106, 107; 356/401, 375

[56] References Cited

U.S. PATENT DOCUMENTS

| | | | |
|---|---|---|---|
| 3,058,093 | 10/1962 | Vernon et al. | 382/48 |
| 3,200,373 | 8/1965 | Rabinow | 382/48 |
| 3,543,238 | 11/1970 | Schale | 382/48 |
| 4,167,728 | 9/1979 | Sternberg | 382/49 |
| 4,334,241 | 6/1982 | Kashioka et al. | 358/107 |
| 4,395,698 | 7/1983 | Sternberg et al. | 382/27 |
| 4,408,342 | 10/1983 | Grabowski et al. | 382/9 |
| 4,414,685 | 11/1983 | Sternberg | 382/49 |
| 4,516,266 | 5/1985 | Christopher et al. | 382/48 |
| 4,590,607 | 5/1986 | Kauth | 382/41 |
| 4,644,585 | 2/1987 | Crimmins et al. | 382/48 |
| 4,700,400 | 10/1987 | Ross | 382/27 |
| 4,710,965 | 12/1987 | Kobayashi | 382/41 |
| 4,736,109 | 4/1988 | Dvorzsak | 382/48 |
| 4,742,558 | 5/1988 | Ishibashi et al. | 382/56 |
| 4,786,976 | 11/1988 | Takao et al. | 358/283 |
| 4,791,679 | 12/1988 | Barski et al. | 382/55 |
| 4,805,031 | 2/1989 | Powell | 358/284 |
| 4,809,348 | 2/1989 | Meyer et al. | 382/49 |
| 4,817,186 | 3/1989 | Goolsbey et al. | 382/9 |
| 4,821,333 | 4/1989 | Gillies | 382/49 |
| 4,827,330 | 5/1989 | Walsh et al. | 358/280 |
| 4,858,018 | 8/1989 | Tanaka | 358/456 |

FOREIGN PATENT DOCUMENTS

| | | |
|---|---|---|
| 0308673 | 3/1988 | European Pat. Off. . |
| 0287995 | 10/1988 | European Pat. Off. . |
| 0288266 | 10/1988 | European Pat. Off. . |
| 61-225974 | 10/1986 | Japan . |

OTHER PUBLICATIONS

K. Y. Wong, et al.; "Document Analysis System"; IBM J. Res. Development; vol. 26, No. 6; Nov., 1982.
Stanley R. Sternberg; "Biomedical Image Processing"; IEEE; Jan. 1983.
Petros Maragos; "Tutorial on Advances in Morphological Image Processing and Analysis"; Optical Engineering; vol. 26, No. 7; Jul. 1987.
Robert M. Haralick et al.; "Image Analysis Using Mathematical Morphology"; IEEE; vol. PAM1-9, No. 4; Jul. 1987.

*Primary Examiner*—Joseph Mancuso
*Attorney, Agent, or Firm*—Townsend and Townsend

[57] ABSTRACT

A technique for rapidly and efficiently registering binary images, contemplates incorporating one or more reference features, referred to as fiducials, into the binary image at a known displacement from a feature of interest in the image, subjecting the image to an operation (typically a morphological operation and possibly a thresholded reduction) that projects out the fiducial(s), determining the position of the fiducial(s), and thereby determining the position of the feature of interest. The fiducial(s) must have at least one characteristic that is absent from the remaining (or at least from neighboring) portions of the image. In one set of embodiments, each fiducial includes horizontal and vertical line segments that are longer than any line segments expected to be found in the binary image. Projecting out the fiducial entails erosions using hit-miss structuring elements. In another embodiment, each fiducial is a small finely textured region.

10 Claims, 6 Drawing Sheets

IMAGE REGISTRATION

BACKGROUND OF THE INVENTION

The invention relates generally to image processing and more specifically to a technique for registering images, typically for further processing.

In general, the more image there is to process, the greater the time (and expense) to process it. In certain cases, it is known in advance that information of interest is located in specific portions of the image. An example is a preprinted form with spaces or boxes that have been filled in, either by hand or by a computer. Clearly, significant time savings can be realized if only the regions of interest need to be processed.

However, between the time it was printed and the time it is analyzed, the form may have been photocopied, and it more likely than not has passed through an optical scanner or the like. Thus, despite remarkable advances in paper handling and optical technologies, there is a reasonable chance that the document will have been skewed (perhaps by a few degrees), scaled (perhaps by a few percent), and translated. Thus, the regions of interest may well not be where they are supposed to be.

SUMMARY OF THE INVENTION

The present invention provides a technique for rapidly and efficiently registering binary images, thereby facilitating further image processing.

The invention contemplates incorporating one or more reference features, referred to as fiducials, into the binary image at a known displacement from a feature of interest in the image, subjecting the image to an operation (typically a morphological operation and possibly a thresholded reduction) that projects out the fiducial(s), determining the position of the fiducial(s), and thereby determining the position of the feature of interest. The fiducial(s) must have at least one characteristic that is absent from the remaining (or at least from neighboring) portions of the image. In general it is preferred to provide a number of spatially separated fiducials so that small amounts of skew and reduction/enlargement can be determined and taken into account.

Thresholded reductions and morphological operations will be defined and discussed in detail below. A thresholded reduction entails mapping a rectangular array of pixels onto a single pixel, whose value depends on the number of ON pixels in the rectangular array and a threshold level. Morphological operations use a pixel pattern called a structuring element (SE) to erode, dilate, open, or close an image.

In one set of embodiments, each fiducial includes horizontal and vertical line segments (preferably in a corner or crossing configuration) that are longer than any line segments expected to be found in the binary image. Projecting out the fiducial entails erosions or open operations using hit-miss structuring elements.

In another embodiment, each fiducial is a small finely textured region. The image can be subjected to a sequence of morphological or other operations that have the effect of blackening the textured region and eliminating ON pixels in all other regions. Alternatively the image can be eroded with a hit-miss structuring element that corresponds to the repeating pattern in the textured region. This can then be followed by dilation or a close operation.

A further understanding of the nature and advantages of the present invention may be realized by reference to the remaining portions of the specification and the drawings.

DESCRIPTION OF SPECIFIC EMBODIMENTS

DEFINITIONS AND TERMINOLOGY

The present discussion deals with binary images. In this context, the term "image" refers to a representation of a two-dimensional data structure composed of pixels. A binary image is an image where a given pixel is either "ON" or "OFF." Binary images are manipulated according to a number of operations wherein one or more source images are mapped onto a destination image. The results of such operations are generally referred to as images. The image that is the starting point for processing will sometimes be referred to as the original image.

Pixels are defined to be ON if they are black and OFF if they are white. It should be noted that the designation of black as ON and white as OFF reflects the fact that most documents of interest have a black foreground and a white background. While the techniques of the present invention could be applied to negative images as well, the discussion will be in terms of black on white.

A "solid region" of an image refers to a region extending many pixels in both dimensions within which substantially all the pixels are ON.

A "textured region" of an image refers to a region that contains a relatively fine-grained pattern. Examples of textured regions are halftoned or stippled regions.

"Text" refers to portions of a document or image containing letters, numbers, or other symbols including non-alphabetic linguistic characters.

"Line graphics" refers to portions of a document or image composed of graphs, figures, or drawings other than text, generally composed of horizontal, vertical, and skewed lines having a substantial run length as compared to text. Graphics could range from horizontal and vertical lines in an organization chart to more complicated horizontal, vertical, and skewed lines in engineering drawings.

A "mask" refers to an image, normally derived from an original image, that contains substantially solid regions of ON pixels corresponding to regions of interest in the original image. The mask may also contain regions of ON pixels that don't correspond to regions of interest.

AND, OR, and XOR are logical operations carried out between two images on a pixel-by-pixel basis.

NOT is a logical operation carried out on a single image on a pixel-by-pixel basis.

"Expansion" is a scale operation characterized by a SCALE factor N, wherein each pixel in a source image becomes an N×N square of pixels, all having the same value as the original pixel.

"Reduction" is a scale operation characterized by a SCALE factor N and a threshold LEVEL M. Reduction with SCALE=N entails dividing the source image into N×N squares of pixels, mapping each such square in the source image to a single pixel on the destination image. The value for the pixel in the destination image is determined by the threshold LEVEL M, which is a number between 1 and $N^2$. If the number of ON pixels in the pixel square is greater or equal to M, the destination pixel is ON, otherwise it is OFF.

"Subsampling" is an operation wherein the source image is subdivided into smaller (typically square) elements, and each element in the source image is mapped to a smaller element in the destination image. The pixel values for each destination image element are defined by a selected subset of the pixels in the source image element. Typically, subsampling entails mapping to single pixels, with the destination pixel value being the same as a selected pixel from the source image element. The selection may be predetermined (e.g. upper left pixel) or random.

A "4-connected region" is a set of ON pixels wherein each pixel in the set is laterally or vertically adjacent to at least one other pixel in the set.

An "8-connected region" is a set of ON pixels wherein each pixel in the set is laterally, vertically, or diagonally adjacent to at least one other pixel in the set.

A number of morphological operations map a source image onto an equally sized destination image according to a rule defined by a pixel pattern called a structuring element (SE). The SE is defined by a center location and a number of pixel locations, each having a defined value (ON or OFF). Other pixel positions, referred to as "don't care", are ignored. The pixels defining the SE do not have to be adjacent each other. The center location need not be at the geometrical center of the pattern; indeed it need not even be inside the pattern.

A "solid" SE refers to an SE having a periphery within which all pixels are ON. For example, a solid 2×2 SE is a 2×2 square of ON pixels. A solid SE need not be rectangular.

A "hit-miss" SE refers to an SE that specifies at least one ON pixel and at least one OFF pixel.

"Erosion" is a morphological operation wherein a given pixel in the destination image is turned ON if and only if the result of superimposing the SE center on the corresponding pixel location in the source image results in a match between all ON and OFF pixels in the SE and the underlying pixels in the source image.

"Dilation" is a morphological operation wherein a given pixel in the source image being ON causes the SE to be written into the destination image with the SE center at the corresponding location in the destination image. The SE's used for dilation typically have no OFF pixels.

"Opening" is a morphological operation that consists of an erosion followed by a dilation. The result is to replicate the SE in the destination image for each match in the source image.

"Closing" is a morphological operation consisting of a dilation followed by an erosion.

The various operations defined above are sometimes referred to in noun, adjective, and verb forms. For example, references to dilation (noun form) may be in terms of dilating the image or the image being dilated (verb forms) or the image being subjected to a dilation operation (adjective form). No difference in meaning is intended.

SYSTEM OVERVIEW

Figure 1:
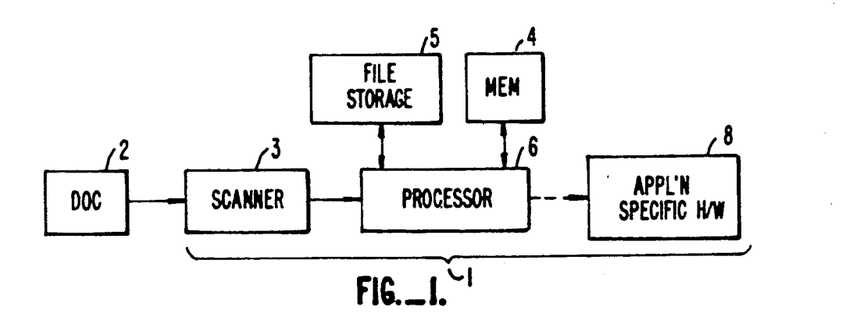
FIG. 1 is a block diagram of an image scanning and processing system incorporating the present invention.

FIG. 1 is a block diagram of an image analysis system 1 within which the present invention may be embodied. The basic operation of system 1 is to extract or eliminate certain characteristic portions of a document 2. To this end, the system includes a scanner 3 which digitizes the document on a pixel basis, and provides a resultant data structure, typically referred to as an image. Depending on the application, the scanner may provide a binary image (a single bit per pixel) or a gray scale image (a plurality of bits per pixel). The image contains the raw content of the document, to the precision of the resolution of the scanner. The image may be sent to a memory 4 or stored as a file in a file storage unit 5, which may be a disk or other mass storage device.

A processor 6 controls the data flow and performs the image processing. Processor 6 may be a general purpose computer, a special purpose computer optimized for image processing operations, or a combination of a general purpose computer and auxiliary special purpose hardware. If a file storage unit is used, the image is transferred to memory 4 prior to processing. Memory 4 may also be used to store intermediate data structures and possibly a final processed data structure.

The result of the image processing, of which the present invention forms a part, can be a derived image, numerical data (such as coordinates of salient features of the image) or a combination. This information may be communicated to application specific hardware 8, which may be a printer or display, or may be written back to file storage unit 5.

SPECIFIC EMBODIMENTS

Figure 2A:
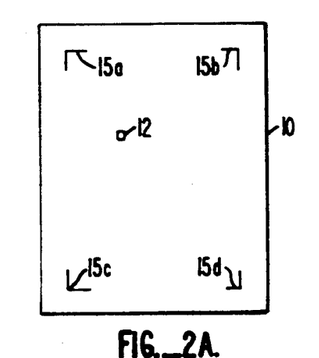
FIGS. 2A and 2B show documents with specific fiducial line patterns provided thereon.
Figure 2B:
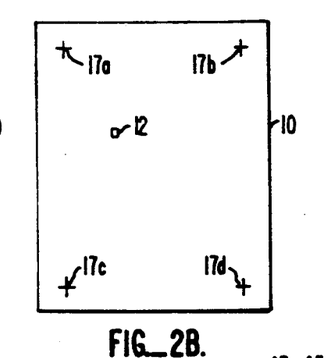

FIG. 2A is a schematic representation of an image 10 to be processed. By way of example, image 10 includes a feature of interest 12 whose position must be determined, possibly for further processing of portions of the image. In accordance with the invention, image 10 is provided with a number of fiducials 15a–d, which are reference marks located at nominally known locations relative to the feature of interest. FIG. 2B shows an image 10 (with a feature of interest 12) having different fiducials 17a–d.

Fiducials 15a–d and 17a–d are distinguished by a characteristic that is not shared by remaining portions of the image. In the particular examples fiducials 15a–d are corners formed by the meeting of two perpendicular lines at respective end points of each, while fiducials 17a–d are crossings formed by the intersection of two perpendicular lines. These fiducial patterns are appropriate so long as the line segments are longer than the line segments adjacent to other corners of the image.

According to the invention, image 10 is subjected to a series of operations that project out the fiducials and determine their positions. This allows the position of the feature of interest to be determined. It is in general not necessary to subject the entire image to these processing steps. For example, the fiducials will be in positions that are generally known, and therefore it may only be necessary to process the regions reasonably likely to be occupied by the fiducials. In the cases illustrated, the fiducials are generally near the corners of the image, and therefore rectangular areas generally near the corners are all that need to be processed. In the event that fiducials are searched for in limited portions of the image, the distinguishing feature of the fiducials need not be absent from all other portions of the image. It need only be absent from the portions near the fiducials.

Figure 3:
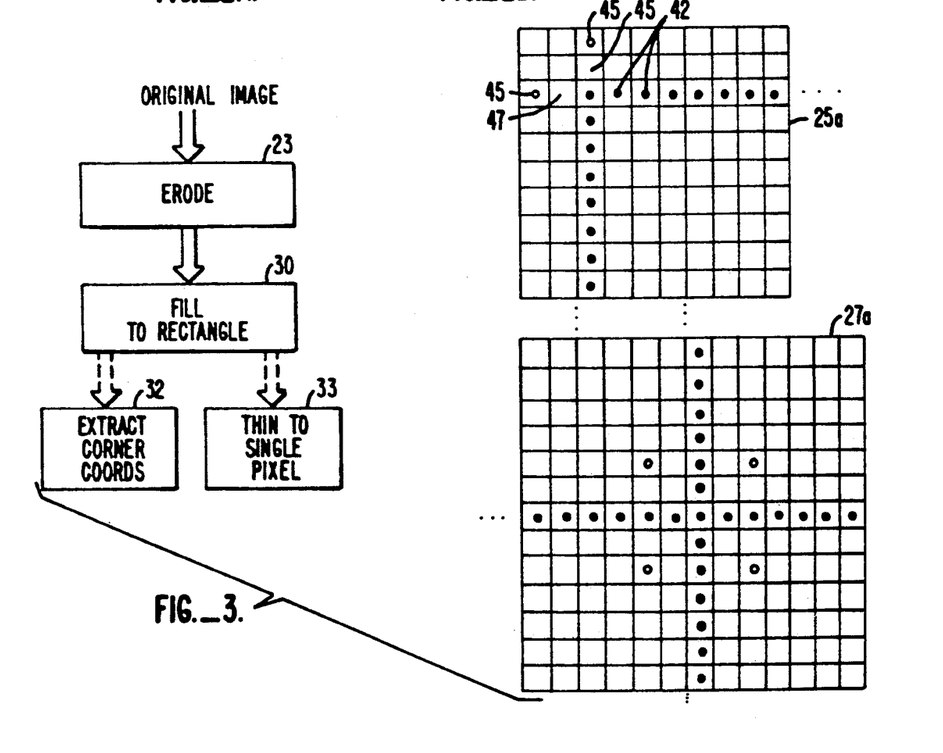
FIG. 3 is a flow diagram illustrating a technique for determining the location of the fiducials.

FIG. 3 is a flow diagram illustrating a sequence of operations for extracting the positions of the fiducials. The image is subjected to an erosion (step 23) with a structuring element (SE) 25a for fiducial 15a or an SE 27a for fiducial 17a. The result of erosion step 23 is an image with ON pixels in only those positions where the SE matches the image. These ON pixels should be relatively few in number and closely clustered. This resulting image is subjected to an operation that expands the pixel regions to the smallest bounding rectangle (step 30). The rectangle is then processed in one of two ways to determine its location: (a) it may be subjected to an operation to extract its corner coordinates (step 32), or (b) it may be thinned in order to result in a single pixel (step 33).

The coordinates of three fiducials are theoretically sufficient to compute translation, rotation (skew), and scale factors in two orthogonal directions so long as the fiducials are not collinear. However, for robustness, it is preferred to use the coordinates of four fiducials, which also serves as a consistency check.

SE 25a is a hit-miss SE suitable for extracting fiducial 15a, which has two perpendicular line segments meeting at an upper left corner. Hit-miss SE 25a comprises a number of hits (ON pixels) 42 in an upper left corner configuration, a number of misses (OFF pixels) 45 along the lines beyond the corner, and a small number of "don't care" pixels 47 immediately adjacent the corner. The center position of this SE is the ON pixel at the corner. Pixel positions 47 allow for the possibility that there might be some noise in the image. Thus, erosion of fiducial 15a by SE 25a will tend to yield a small group of pixels, clustered at the corner location, and generally corresponding in size to the thickness of the lines in the fiducial. Corresponding SE's, rotated by 90° increments, are used to determine the locations of fiducials 15b-d.

SE 27a is suitable for projecting out fiducial 17a, which has two intersecting line segments. The SE includes two rows of hits 52 arranged in a cruciform pattern. Additionally, in order to exclude a match on a large region of ON pixels, the SE contains four misses 55 surrounding the cross center a few pixels out. The center position of this SE is the ON pixel at the intersection. This same SE is suitable for extracting fiducials 17b-d, which are the same as fiducial 17a.

Figure 4:
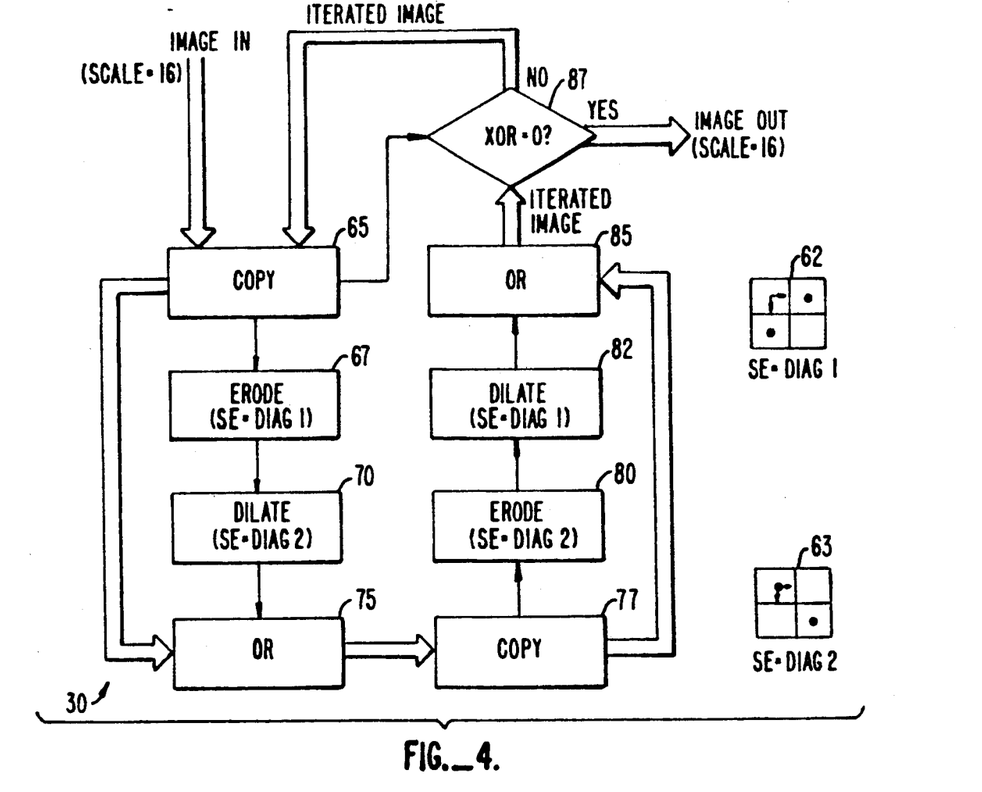
FIG. 4 is a flow diagram illustrating a technique for filling 8-connected regions to rectangles.

FIG. 4 is an expanded flow diagram illustrating the steps within step 30 (filling to a rectangle). A presently preferred technique for filling all 8-connected regions to the smallest possible enclosing rectangle utilizes an iterated sequence of erosions and dilations using two diagonal SE's 62 and 63. SE 62 has two ON pixels, one to the immediate right of the center and one immediately beneath the center. SE 63 has two ON pixels, one at the center and one diagonally down to the right.

The input image (containing the small regions of pixels resulting from the erosions) is copied (step 65), with one copy reserved for later use and one copy being a work copy subject to succeeding operations. The work copy is first eroded (step 67) with SE 62, and then dilated (step 70) with SE 63. The result of this erosion and dilation is subjected to a logical OR (step 75) with the copy reserved at copy step 65. The result of the logical OR is copied (step 77), with one copy being reserved for use and the other being a work copy. The work copy is eroded (step 80) with SE 62, and dilated (step 82) with SE 63. The resulting image and the copy reserved at copy step 77 are subjected to a logical OR (step 85). The resultant iterated image and the copy of the input image reserved at step 65 are subjected to an exclusive OR. If the iterated image has not changed (the XOR of the two images contains no ON pixels), the process is complete. If the iterated image has changed (the XOR of the two images contains at least one ON pixel), the iterated image is communicated back and subjected to steps 65 through 87. The cycle repeats until the iterated image agrees with the last version reserved at copy step 65.

Figure 5:
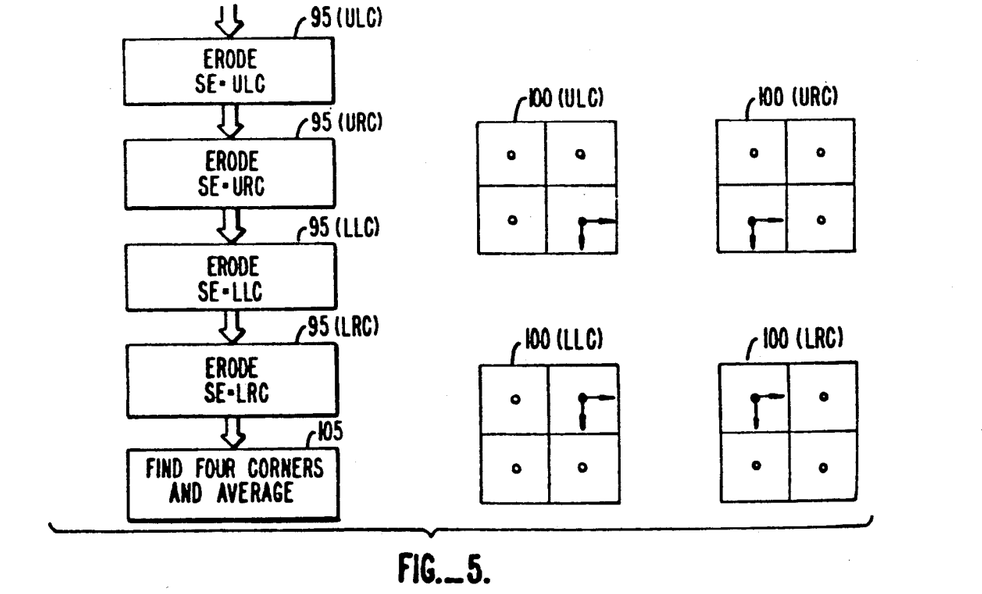
FIG. 5 is a flow diagram illustrating a technique for extracting corner coordinates.

FIG. 5 is a flow diagram illustrating the steps within step 33 (extracting the coordinates of the solid regions). The locations of the corners of each solid rectangular region are extracted by a series of erosion steps 95(ULC), 95(URC), 95(LLC), and 95(LRC), using respective SE's 100(ULC), 100(URC), 100(LLC), and 100(LRC). SE 100(ULC) is a 2×2 array including an ON pixel in the lower right corner and OFF pixels in the other three corners. It thus operates to pick out the upper left corner when it is used to erode a rectangle. The other SE's pick out the other corners. This series of erosions results in four pixel locations for each fiducial region. The pixel locations for each fiducial region can be averaged (step 105) to specify that fiducial's center.

Figure 6:
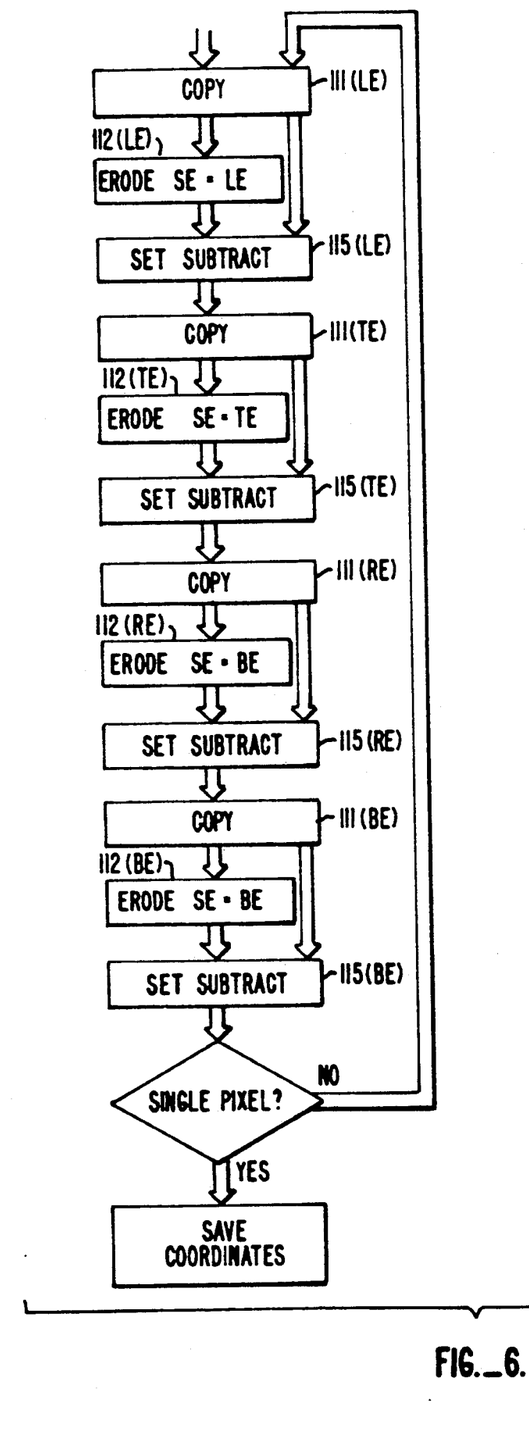
FIG. 6 is a flow diagram illustrating a technique for thinning a rectangle down to a single pixel.

FIG. 6 is a flow diagram illustrating a technique for thinning a solid rectangular region to a single ON pixel. The basic technique is to remove pixels along the rectangle's edges until a single pixel remains, using a set of four hit-miss SE's 110(LE), 110(TE), 110(RE), and 110(BE). SE's 110(LE) and 110(RE) are 1×3 horizontal arrays. SE 110(LE) has an OFF pixel at the left position and ON pixels at the center and right positions. SE 110(RE) has ON pixels at the left and center positions and an OFF pixel at the right position. SE's 110(TE) and 110(BE) are 3×1 vertical arrays. SE 110(TE) has an OFF pixel at the top position and ON pixels at the center and bottom positions. SE 110(BE) has ON pixels at the top and center positions and an OFF pixel at the bottom position. All the SE's have the center pixel as the center location for the SE.

The input image is subjected to an alternating series of erosions and set subtractions. The image is first copied (step 111(LE)), with one copy being reserved and one copy being a work copy. The work copy is then eroded (step 112(LE)) with SE 110(LE). The result is to project out the pixels along the left edge of the rectangle. A set subtraction step 115(LE), which entails ANDing the reserved copy with the complement of the eroded work copy, removes these projected pixels from the original image, thus resulting in a rectangle having its left edge removed. This is followed by a copy step 111(TE), an erosion 112(TE) using SE 110(TE), and a set subtraction 115(TE), which removes the pixels along the top edge; a copy step 111(RE), an erosion 112(RE) with SE 110(RE), and a set subtraction 115(RE), which removes the pixels along the right edge; and a copy step 111(BE), an erosion 112(BE) with SE 110(BE), and a set subtraction 115(BE), which removes the pixels along the bottom edge. It is noted that the erosion will only project out pixels along the edge if the rectangle has at least two pixels along the long dimension of the SE. Thus, if the rectangle has been thinned to a horizontal line, erosion by the vertical SE's followed by set subtraction will have no effect. Once all four edges have been processed, the result is tested (step 120) in order to determined if only a single pixel exists. If not, the entire sequence is repeated. If so, the coordinates of the single pixel are saved (step 125).

Figure 7:
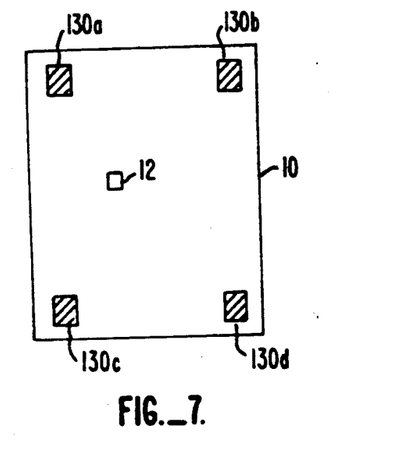
FIG. 7 shows a document with fiducials defined by finely textured regions.

FIG. 7 shows an image 10 (with a feature of interest 12) having fiducials 130a-d in the form of small, preferably rectangular regions having a finely textured pattern. Although shown as cross-hatched in the drawing, it is to be understood that the pattern within the rectangular regions is a stippled or halftoned pattern of uniform intensity, consisting of a number of black dots on a white background. The pattern is characterized by a period (dot separation) and angle.

Figure 8:
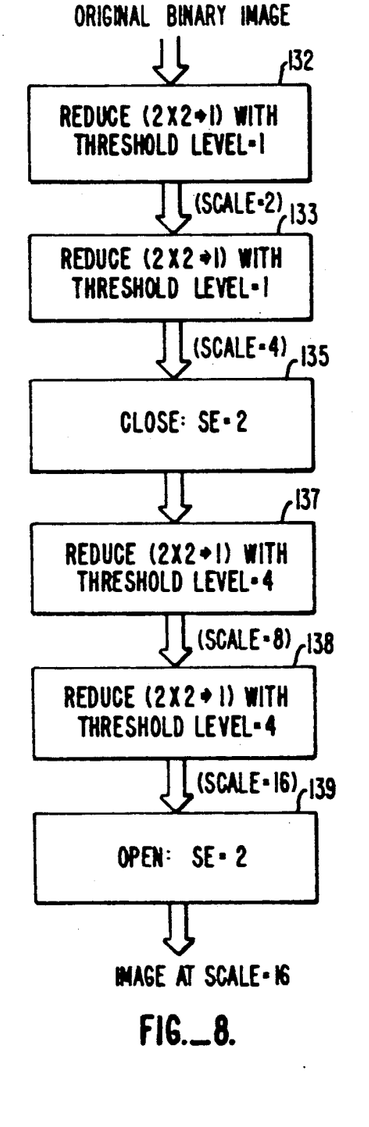
FIG. 8 is a flow diagram illustrating a technique for determining the location of the textured fiducials.

FIG. 8 is a flow diagram illustrating one technique for converting fiducials 130a-d to rectangles of solid black, which can then be processed to determine their positions as discussed above in connection with steps 32 and 33. In brief, the image is first subjected to a set of operations that eliminate OFF pixels that are near ON pixels. While text and lines in the image are thickened, they tend to retain their general character. However, as the small dots in the textured regions expand, they coalesce to form large masses and thereby solidify the formerly textured area. Subsequent processing can reverse the thickening of characters and lines, but not the solidification of the now solid regions.

The image is twice reduced with SCALE=2 and LEVEL=1 (steps 132 and 133). The result is an image reduced by a linear factor of 4 and having the textured regions darkened. The reduced image is then subjected to a close operation (step 135) to finish the solidification of the textured region. The close operation consists of a dilation and an erosion, preferably with a solid 2×2 SE. The result of the close operation is invariant as to which of the pixels in the SE is designated as the center.

The resulting image is then twice reduced (steps 137 and 138) with SCALE=2 and LEVEL=4. The resulting image, now reduced by a linear factor of 16, contains only a few isolated ON pixels within the regions outside the once textured (now solid) fiducial regions. The image is then subjected to an open operation (step 139), preferably with the same solid 2×2 SE used in close operation 135, to eliminate the ON pixels outside the fiducial regions.

The result is then optionally filled (step 140) to a rectangle in the manner discussed above in connection with step 30. The result of the previous operations is an image at reduced scale consisting only of solid black rectangular fiducials. The fiducial positions can be obtained by extracting the corner coordinates or thinning the solid rectangles to a respective single pixel. This can be done at the reduced scale, and the coordinates scaled accordingly.

In the event that it is desired to expand the processed image to original size, account may be taken of the fact that reductions 137 and 138 and OPEN operation 139 acted to relatively reduce the size of the filled regions. On expansion, this may be compensated by expanding the image with SCALE=2 and then dilating the image using a 3×3 solid SE with the SE center in the middle. This causes the boundary of each rectangle of ON pixels to be expanded outwardly by one pixel. The resulting image is then expanded with SCALE=8 returning to full scale.

Figure 9:
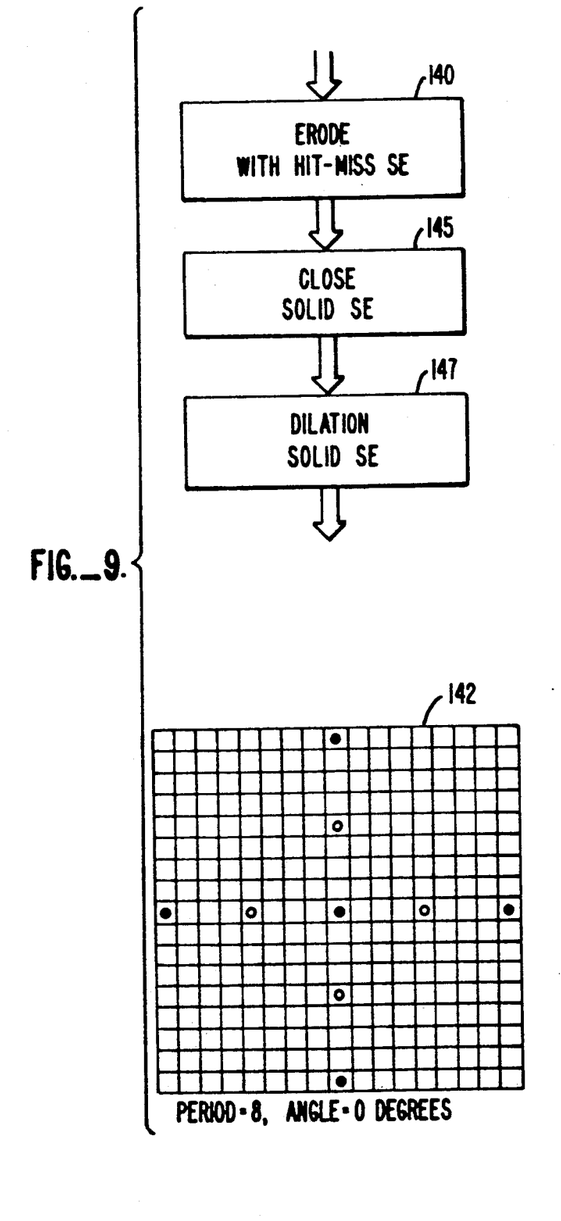
FIG. 9 is a flow diagram of an alternative technique for determining the location of the textured fiducials.

FIG. 9 is a flow diagram illustrating a different technique for converting fiducials 130a-d to rectangles of solid black, for further processing to extract fiducial positions. The image is eroded (step 140) with a hit-miss SE 142, which is tailored to the particular texture pattern. More particularly, the SE consists of five ON pixels and four OFF pixels in a cruciform pattern with the ON pixels at the center and corners of a square and the OFF pixels midway between the center and the corners. In the specific example, the SE corresponds to a period of eight pixels and an angle of 0°. The result is an image containing a number of ON pixels in the textured regions. This is subjected to a close operation (step 145) and a dilation (step 147) with a solid SE. The result is then filled to a rectangle and the coordinates determined by either extracting the corners or thinning to a single pixel as discussed above.

DISCUSSION OF ILLUSTRATIVE ALTERNATIVES

Figure 10A:
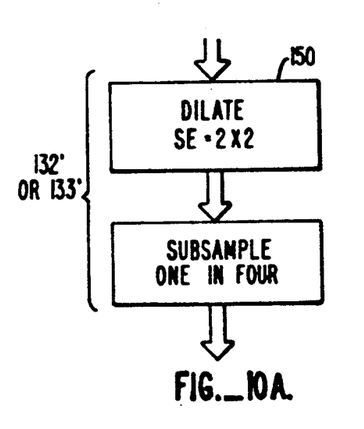
FIG. 10A and 10B are flow diagrams illustrating alternatives to the thresholded reductions used to fill the textured fiducials.

FIG. 10A is an expanded flow diagram illustrating an alternative to the use of threshold reductions with LEVEL=1 to fill the textured areas. More particularly, the image is dilated with a solid 2×2 SE (all pixels ON) (step 150) and the resultant image sub-sampled by choosing one pixel in each 2×2 square to form a reduced image (step 152). The sub-sampling may be accomplished on a row basis by discarding every other line, and on the column basis by use of a lookup table in a manner similar to that described above in connection with performing fast thresholded reductions.

In principle one could also use a series of close operations in an attempt to solidify a finely textured region. However, the use of one or more thresholded reductions (or dilation and subsampling) has at least two advantages. First, because the texture scale is not known a priori, it cannot be determined how large an SE to use in the close operation. An SE that is too small to bridge adjacent parts in the textured region would not change the image, and the close operation would fail. Thus, while the use of the close would be locally all or nothing, the use of a reduction with LEVEL=1 (or a dilation and subsampling) invariably results in a darkening of the texture. Second, the use of reductions before close allows the close operation to be carried out at a reduced scale. Comparable operations at full scale are much slower computationally than those at a reduced scale (roughly by the third power of the linear scale factor). Therefore, all subsequent operations at reduced scale are much faster.

Figure 10B:
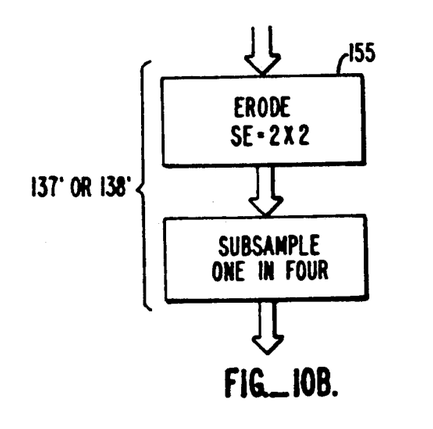

FIG. 10B is an expanded flow diagram illustrating an alternative to the use of thresholded reductions with LEVEL=4 to remove text and line graphics. The image is first eroded with a solid 2×2 SE (step 155) and the resultant image sub-sampled by choosing one pixel in each 2×2 square to form a reduced image (step 157).

The above comments in connection with filling the textured regions apply to removing text and line features. In principle one could also use a series of open operations in an attempt to remove such features. However, the use of one or more thresholded reductions (or erosion and subsampling) has at least two advantages. First, because the feature scale is not known a priori, it cannot be determined how large an SE to use in the open operation. An SE that is too small to eliminate features in the textured region would not change the image, and the open operation would fail. Thus, while the use of the open would be locally all or nothing, the use of a reduction with LEVEL=4 (or an erosion and subsampling) invariably results in a removal or thinning of the feature. Second, the use of reductions before open allows the open operation to be carried out at a reduced scale.

The selection of a particular size for the SE is empirically based, taking into consideration the texture size and text size. However, the decision tends to be rather straightforward, entailing a minimum amount of experimentation.

Although the thresholded reductions are considered advantageous for the filling and removal steps, the same result is likely to be achieved by doing a dilation with a solid 8×8 SE and an erosion with a solid 32×32 SE. However, the computation is likely to take much longer.

Figure 11:
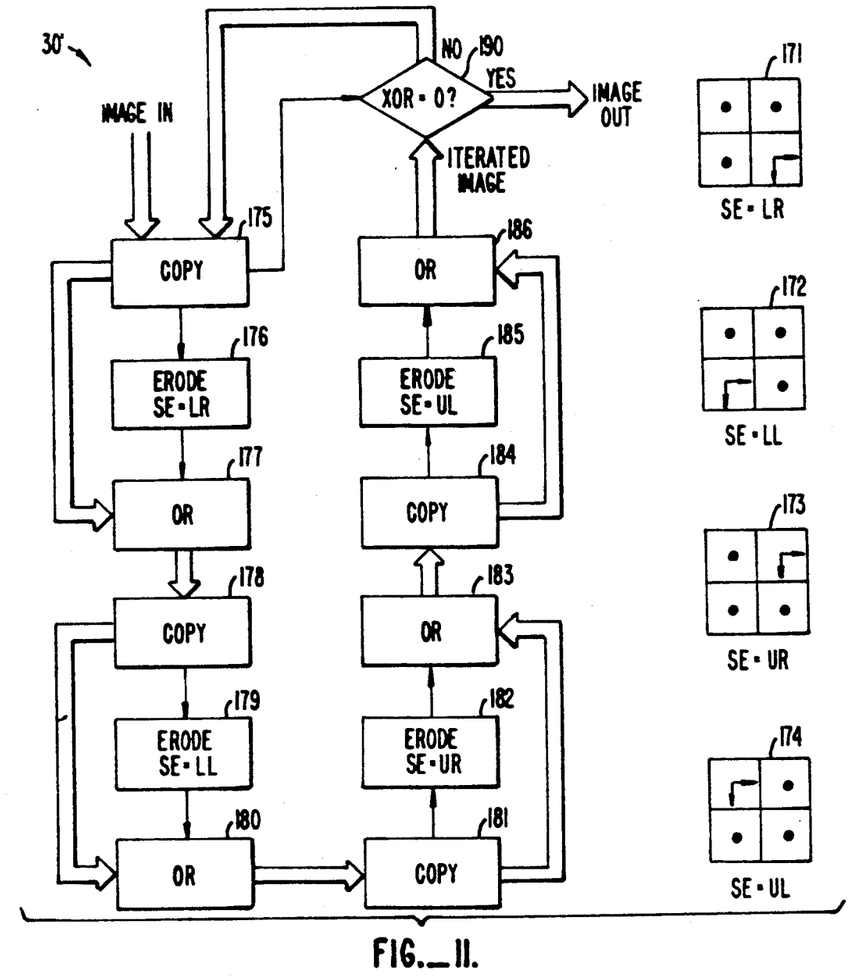
FIG. 11 is a flow diagram illustrating a technique for filling 4-connected regions to rectangles.

FIG. 11 is an expanded flow diagram illustrating an alternative technique for filling holes in solid areas. The technique is to fill all 4-connected regions (rather than 8-connected regions as described above) to the smallest enclosing rectangle. This is accomplished by an iterated sequence of erosions and logical OR's using 4 SE's 171, 172, 173, and 174. Each of the SE's contains three ON pixels at three of the four corners of a 2×2 square with the remaining corner being a "don't care" position which also defines the center position of the SE. The input image (reduced by a scale factor of 16 as described above) is copied (step 175), with one copy reserved for later use and one copy being a work copy. The work copy is eroded (step 176) with SE 171, and then ORed (step 177) with the work copy. The resulting image is then copied (step 178) with one copy being reserved for use and the other being a work copy. The work copy is eroded (step 179) with SE 172, and the result is ORed (step 180) with the work copy. The sequence is repeated with copy step 181, erosion step 182 with SE 173 and logical OR step 183, followed by copy step 184, erosion step 185 with SE 174, and logical OR step 186. The result is an iterated image which is subjected to an exclusive OR (step 190) with the image input to copy step 175. If the iterated image is not changed (the XOR of the two images contains no ON pixels), the process is complete. If the iterated image has changed (the XOR of the two images contains at least one ON pixel), the iterated image is communicated back and subjected to steps 175 through 186. The complete cycle repeats until the iterated image agrees with the last version reserved at copy step 175. In certain applications, it may be desired to perform a small number of iterations to effect only a partial fill.

FAST THRESHOLD REDUCTION (AND EXPANSION) OF IMAGES

One requirement of efficient segmentation, is that thresholded reduction must be done quickly. Suppose it is desired to reduce an image by a factor of two in the vertical direction. One way to do this is to use a raster operation (bitblt—bit block transfer) to logically combine the odd and even rows, creating a single row of the reduced image for each pair of rows in the original. The same procedure can then be applied to the columns of the vertically squashed image, giving an image reduced by a factor of two in both directions.

The result, however, depends on the logical operations of the horizontal and vertical raster operations. Obtaining a result with LEVEL=1 or 4 is straightforward. If an OR is used for both raster operation orientations, the result is an ON pixel if any of the four pixels within the corresponding 2×2 square of the original were ON. This is simply a reduction with LEVEL=1. Likewise, if an AND for both raster operation orientations, the result is a reduction with LEVEL=4, where all four pixels must be ON.

A somewhat different approach is used to obtain a reduction with LEVEL=2 or 3. Let the result of doing a horizontal OR followed by a vertical AND be a reduced image R1, and let the result from doing a horizontal AND followed by a vertical OR be a reduced image R2. A reduction with LEVEL=2 is obtained by ORing R1 with R2, and a reduction with LEVEL=3 is obtained by ANDing R1 with R2.

The procedure may not be computationally efficient if implemented as described above. On some computers, such as Sun workstations, raster operations are done in software. The image is stored as a block of sequential data, starting with the first row of the image, moving left-to-right, then the second row, etc. Consequently, the raster operations between rows are fast, because 16 or 32 bits in two words can be combined in one operation. But to perform a raster operation between two columns, the corresponding bits must be found, two bits at a time (one from each column), before the logical operations can be done. It turns out that the time, per pixel, to do the vertical raster operations is at least 25 times greater than the horizontal ones. In fact, when the algorithm is implemented entirely with raster operations, over 90 percent of the time is devoted to the vertical operations.

Fortunately, there is a simple and very fast way to implement the logical operations between columns. Rather than use column raster operations, take 16 sequential bits, corresponding to 16 columns in one row. These 16 bits can be accessed as a short integer. These 16 bits are used as an index into a $2^{16}$-entry array (i.e. a lookup table) of 8-bit objects. The 8-bit contents of the array give the result of ORing the first bit of the index with the second, the third bit with the fourth ... and on to the 15th bit with the 16th. Actually, two arrays are needed, one for ORing the 8 sets of adjacent columns, and one for ANDing the columns. It should be understood that the numerical example is just that, an example. It is also possible to implement this as a $2^8$-entry array of 4-bit objects, or any one of a number of other ways.

The use of lookup tables to implement column logical operations is about as fast, per pixel, as Sun's row raster operations. A 1000×1000 pixel image can be reduced on a Sun 3/260, with either LEVEL=1 or 4, to a 500×500 pixel image in 0.1 seconds. On a Sun 4/330, the operation takes about 0.04 second.

SPECIAL HARDWARE CONFIGURATION

As discussed above, 2×2 reductions require a first logical operation between rows followed by a second, possibly different, logical operation between columns. Moreover, some threshold levels require two intermediate reduced images which are then combined. The table lookup technique for column operations can become cumbersome if it is desired to have a very wide pixelword. Either the table becomes enormous or one needs special techniques of looking up parts of the wide pixelword in multiple parallel tables. The latter, while clearly superior, does require some way to use portions of the data word as memory addresses, which may not otherwise be necessary.

Figure 12:
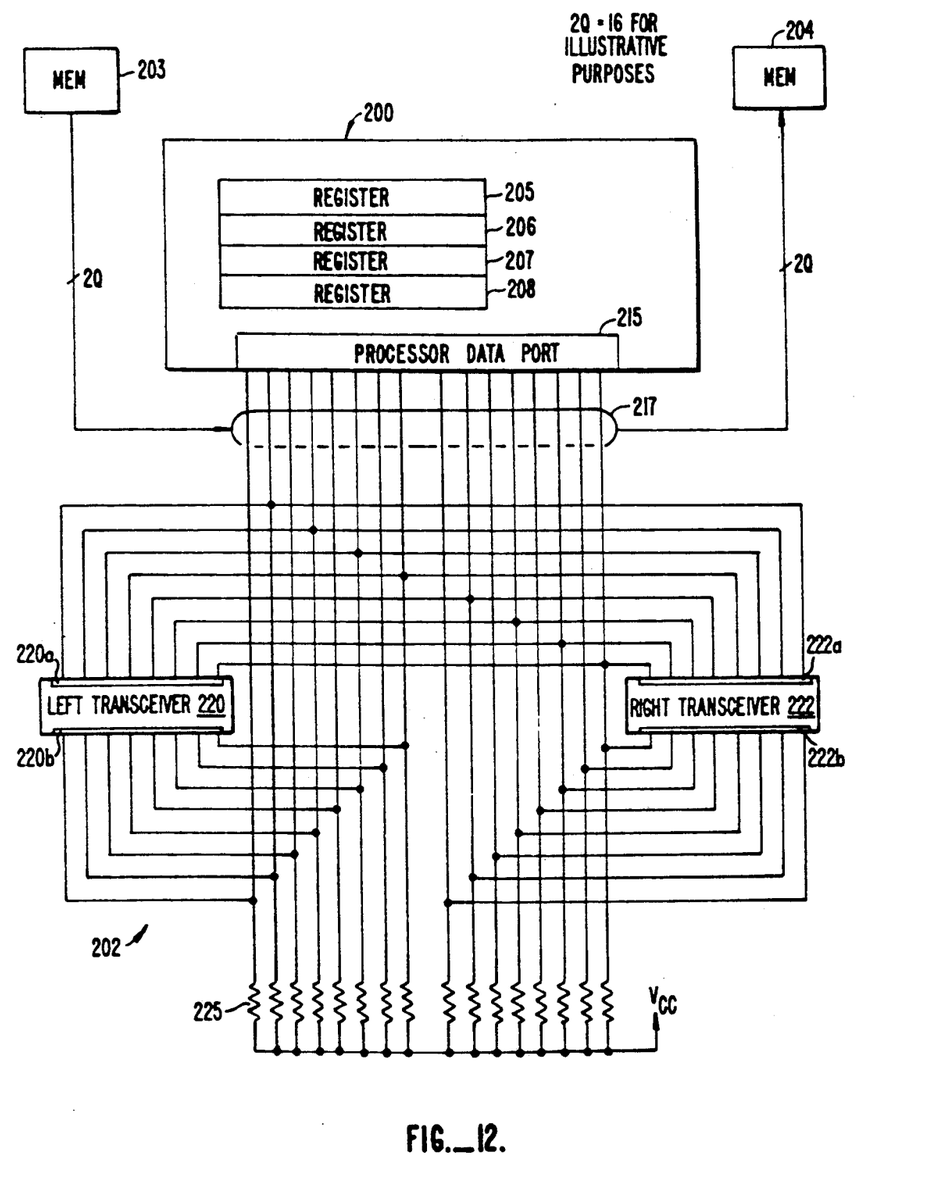
FIG. 12 is a block diagram of special purpose hardware for performing image reductions and expansions.

FIG. 12 is a logic schematic of specialized hardware for performing a logical operation between vertically adjacent 2Q-bit pixelwords and a pairwise bit reduction of the resulting 2Q-bit pixelword (bits 0 through 2Q-1). Although the drawing shows a 16-pixel word, the benefits of this hardware would become manifest for much longer pixelwords where the lookup table technique has become cumbersome. A 512-bit pixelword is contemplated, since a line of image would represent only a few pixelwords.

The reduction of the two pixelwords occurs in two stages, designated 200 and 202. In the first stage, a vertically adjacent pair of pixelwords is read from a first memory 203, and the desired first logical operation is carried out between them. The desired second logical operation is then carried out between the resulting pixelword and a version of the pixelword that is shifted by one bit. This provides a processed pixelword having the bits of interest (valid bits) in every other bit position. In the second stage, the valid bits in the processed pixelword are extracted and compressed, and the result stored in a second memory 204. Memory 203 is preferably organized with a word size corresponding to the pixelword size. Memory 204 may be organized the same way.

The preferred implementation for stage 200 is an array of bit-slice processors, such as the IDT 49C402 processor, available from Integrated Device Technology.

This specific processor is a 16-bit wide device, each containing 64 shiftable registers. Thirty-two such devices would be suitable for a 512-bit pixelword. For simplification, a 16-bit system with four registers 205, 206, 207, and 208 is shown. Among the processor's operations are those that logically combine the contents of first and second registers, and store the result in the first. The processor has a data port 215, which is coupled to a data bus 217.

Second stage 202 includes first and second latched transceivers 220 and 222, each half as wide as the pixelword. Each transceiver has two ports, designated 220a and 220b for transceiver 220 and 222a and 222b for transceiver 222. Each transceiver is half as wide as the pixelword. Ports 220a and 222a are each coupled to the odd bits of data bus 217, which correspond to the bits of interest. Port 220b is coupled to bits 0 through (Q-1) of the data bus, while port 222b is coupled to bits Q through (2Q-1). The bus lines are pulled up by resistors 125 so that undriven lines are pulled high.

Consider the case of a 2×2 reduction with LEVEL=2. The sequence of operations requires that (a) a vertically adjacent pair of pixelwords be ANDed to form a single 2Q-bit pixelword, adjacent pairs of bits be ORed to form a Q-bit pixelword, and the result be stored; (b) the vertically adjacent pair of pixelwords be ORed, adjacent bits of the resultant 2Q-bit pixelword be ANDed, and the resultant Q-bit pixelword be stored; and (c) the two Q-bit pixelwords be ORed.

To effect this, a pair of vertically adjacent pixelwords are read from first memory 203 onto data bus 217 and into registers 205 and 206. Registers 205 and 206 are ANDed and the result stored in registers 207 and 208. The content of register 208 is shifted one bit to the right, registers 207 and 208 are ORed, and the result is stored in register 208. Registers 205 and 206 are ORed, and the result stored in registers 206 and 207. The content of register 207 is right shifted by one bit, registers 206 and 207 are ANDed, and the result stored in register 207.

At this point, register 207 contains the result of ORing the two pixelwords and ANDing pairs of adjacent bits, while register 208 contains the result of ANDing the pixelwords and ORing pairs of adjacent bits. However, registers 207 and 208 contain the valid bits in the odd bit positions 1, 3, ... (2Q-1). For a reduction with LEVEL=2, registers 207 and 208 are ORed and the result is made available at processor data port 215 which is coupled to data bus 217.

The odd bits of the data bus are latched into transceiver 220 through port 220a, resulting in a Q-bit pixelword with the valid bits in adjacent positions. Although this Q-bit entity could be read back onto the bus and transferred to memory 204, it is preferable to use both latches. Thus, two new pixelwords (horizontally adjacent to the first two) are processed at stage 200 as described above, the result is made available at processor data port 215, and is latched into transceiver 222 through port 222a. The contents of the two transceivers are then read out through ports 220b and 222b onto data bus 217 in order to provide a 2Q-bit pixelword that represents the reduction of four 2Q-bit pixelwords. The result is transferred to second memory 204. This overall sequence continues until all the pixelwords in the pair of rows has been processed. Once the pair of rows has been processed, subsequent pairs are similarly processed.

As mentioned above each bit-slice processor has 64 registers. Accordingly, since memory accesses are more efficient in a block mode, faster operation is likely to result if 8 pairs of pixelwords are read from memory 203 in a block, processed as discussed above, stored in the processor's registers, and written to memory 204 in a block.

Image enlargement is similar, but the steps are executed in the reverse order. First, the processor reads a pixelword and sends the left half through port 220b of transceiver 220. This is read onto the bus through port 220a. Only every other pixel in the resulting word on the bus will initially be valid, so the processor will need to validate all the pixels using a sequence of shifts and logic operations. Since resistors 225 pull up all the bus lines that are not driven, each undriven line, all the even bits in this case, will be 1's. This expanded pixelword, which alternates 1's with valid data, is read into two registers, the content of one register is shifted one place, and the registers are logically ANDed. Everywhere there was a 0 in an odd bit, there will be 00 in an even-/odd pair. None of the other bits will be affected. This pixelword is then written to two vertically adjacent words in the expanded image. This process is repeated for the right half of the pixelword using the transceiver 222. The processor expands the entire row one pixelword at a time and the entire image one row at a time.

DISCUSSION OF THE SOFTWARE

A current embodiment of the invention is implemented in software on a digital computer. A source code program for implementation of this embodiment is disclosed at columns 19 through 310 of U.S. Pat. No. 5,065,437, issued Nov. 12, 1991, to Bloomberg. Columns 19 through 310 of the U.S. Pat. No. 5,065,437 are hereby incorporated by reference. The program is in the "C" language, well known to those of skill in the art. The program has been demonstrated on a Sun Workstation, although it will be apparent to those of skill in the art that a wide variety of programming languages and hardware configurations could readily be used based on this disclosure without departing from the scope of the invention.

CONCLUSION

In conclusion, it can be seen that the present invention provides a simple and effective way to register an image to a known coordinate system, whereupon features of interest in the image can be processed selectively.

While the above is a complete description of a number of embodiments, various modifications, alternatives, and equivalents may be used. For example, while line pattern and textured fiducials represent preferred implementations, other patterns can be used for registration, so long as they are unique to the registration marks. Therefore, the above description should be taken as limiting the scope of the invention which is defined by the appended claims.

What is claimed is:

1. A method of determining the position of a feature of interest in a binary input image comprising the steps of:

providing as a part of the input image a fiducial at a known displacement from the feature of interest, the fiducial having at least one characteristic that is absent from neighboring portions of the input image;

eroding at least a portion of the input image containing the fiducial with a hit-miss structuring element that shares the characteristic with the fiducial so as to provide a resultant image having a number of ON pixels only in the vicinity of the fiducial;

determining a reference position representative of the position of the number of ON pixels; and combining the reference position with the known displacement to provide the position of the feature of interest.

2. The method of claim 1, and further comprising the step, carried out after said subjecting step, of filling the number of ON pixels to the smallest enclosing rectangle.

3. The method of claim 2 wherein said determining step comprises the step of determining the coordinate of at least one corner of the enclosing rectangle.

4. The method of claim 2 wherein said determining step comprises the step of thinning the rectangle to a single ON pixel.

5. The method of claim 1 wherein the fiducial comprises a pair of intersecting straight lines and wherein the structuring element includes two rows of hits arranged in a cruciform pattern and a plurality of misses surrounding but spaced outwardly from the center of the cruciform pattern.

6. The method of claim 1 wherein the fiducial comprises a pair of straight lines that meet at respective endpoints and wherein the structuring element includes two rows of hits arranged in a corner pattern and a miss along each line beyond the corner but spaced from the corner.

7. A method of determining the position of a feature of interest in a binary input image comprising the steps of:

providing as a part of the input image a fiducial at a known displacement from the feature of interest, the fiducial being in the form of a finely textured region;

subjecting at least a portion of the input image containing the fiducial to a first set of operations that eliminates OFF pixels that are near ON pixels to produce a resulting image with a solid region corresponding to the textured fiducial in the input image;

subjecting the resulting image to a second set of operations that eliminates ON pixels that are near OFF pixels to produce a further resulting image with a solid region corresponding to the textured fiducial in the input image and regions substantially devoid of ON pixels corresponding to other regions in the input image;

determining a reference position representative of the position of the solid region; and combining the reference position with the known displacement to provide the position of the feature of interest.

8. The method of claim 7, and further comprising the step, carried out after said subjecting steps, of filling the number of ON pixels to the smallest enclosing rectangle.

9. The method of claim 8 wherein said determining step comprises the step of determining the coordinate of at least one corner of the enclosing rectangle.

10. The method of claim 8 wherein said determining step comprises the step of thinning the rectangle to a single ON pixel.

* * * * *

UNITED STATES PATENT AND TRADEMARK OFFICE
CERTIFICATE OF CORRECTION

PATENT NO.  : 5,129,014
DATED       : July 7, 1992
INVENTOR(S) : Dan S. Bloomberg It is certified that error appears in the above-identified patent and that said Letters Patent is hereby corrected as shown below:

In the title page, item:
[21] Appl. No.: 349,203 should be --[21] Appl. No.: 449,203--

Signed and Sealed this

Twenty-eighth Day of September, 1993

Attest:

BRUCE LEHMAN

*Attesting Officer*   *Commissioner of Patents and Trademarks*